(12) United States Patent
Müllek (10) Patent No.: US 11,913,511 B2
(45) Date of Patent: Feb. 27, 2024

(54) BRAKE PAD HOLDER FOR A RAIL VEHICLE AND TOOL

(71) Applicant: KNORR-BREMSE Systeme für Schienenfahrzeuge GmbH, Munich (DE)

(72) Inventor: Ferenc Müllek, Szekesfehervar (HU)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 398 days.

(21) Appl. No.: 17/260,985

(22) PCT Filed: Jul. 15, 2019

(86) PCT No.: PCT/EP2019/069023
§ 371 (c)(1),
(2) Date: Jan. 15, 2021

(87) PCT Pub. No.: WO2020/025306
PCT Pub. Date: Feb. 6, 2020

(65) Prior Publication Data
US 2021/0293294 A1 Sep. 23, 2021

(30) Foreign Application Priority Data
Jul. 31, 2018 (DE) ...................... 10 2018 118 514.6

(51) Int. Cl.
*F16D 69/04* (2006.01)
*B61H 5/00* (2006.01)
(Continued)

(52) U.S. Cl.
CPC ..... *F16D 69/0408* (2013.01); *F16D 65/0043* (2013.01); *F16D 65/095* (2013.01); *B61H 5/00* (2013.01); *F16D 55/2245* (2013.01)

(58) Field of Classification Search
CPC .............. F16D 69/0408; F16D 65/095; F16D 65/0043; F16D 55/2245; B61H 5/00
See application file for complete search history.

(56) References Cited

U.S. PATENT DOCUMENTS 3,851,738 A   12/1974   Gebhardt et al.
4,271,936 A *  6/1981   Xaver ................... F16D 65/092
                                                188/250 G
(Continued)

FOREIGN PATENT DOCUMENTS

DE         2841139 A1    4/1980
DE     102009006290 A1   7/2010
(Continued)

OTHER PUBLICATIONS

British Patent No. GB 2031539 to Wirth et al published on Apr. 23, 1980.*

(Continued)

*Primary Examiner* — Pamela Rodriguez
(74) *Attorney, Agent, or Firm* — Barnes & Thornburg LLP (57) ABSTRACT

A brake pad holder for a rail vehicle includes a pad holder and a brake pad held on the pad holder in a locked manner. The pad holder includes a guide channel extending in the longitudinal direction of the pad holder, in which the brake pad can be movably held, wherein, in order to lock the brake pad in the longitudinal direction of the pad holder, a locking latch pivotably held on the pad holder, which protrudes into the guide channel in a locking position in which the brake pad is fixed in a functional position, and is removed from the guide channel in a release position.

10 Claims, 6 Drawing Sheets

(51) Int. Cl.
     *F16D 55/224*    (2006.01)
     *F16D 65/00*     (2006.01)
     *F16D 65/095*   (2006.01)

(56) References Cited

U.S. PATENT DOCUMENTS

| | | | | |
|---|---|---|---|---|
| 6,349,805 | B1 * | 2/2002 | Wirth | F16D 65/092 |
| | | | | 188/234 |
| 2012/0152666 | A1 | 6/2012 | Mosbach et al. | |

FOREIGN PATENT DOCUMENTS

| | | |
|---|---|---|
| DE | 102015107127 A1 | 11/2016 |
| EP | 2587086 A1 | 5/2013 |
| JP | 2008002573 A | 1/2008 |
| JP | 2011236924 A | 11/2011 |
| JP | 5247332 B2 | 7/2013 |

OTHER PUBLICATIONS

German Patent No. DE 3543457 to Schoerwerth et al published on Jun. 11, 1987.*
Translation of Japanese Patent No. JP 2008002573 to Matsuoka et al obtained from website: https://worldwide.espacenet.com on Mar. 13, 2023.*
International Search Report corresponding to PCT/EP2019/069023, dated Oct. 10, 2019.

* cited by examiner

BRAKE PAD HOLDER FOR A RAIL VEHICLE AND TOOL

CROSS REFERENCE AND PRIORITY CLAIM

This patent application is a U.S. National Phase of International Patent Application No. PCT/EP2019/069023 filed Jul. 15, 2019, which claims priority to German Patent Application No. 10 2018 118 514.6, the disclosure of which being incorporated herein by reference in their entireties.

FIELD

Disclosed embodiments relate to a brake lining mounting for a rail vehicle. Moreover, disclosed embodiments relate to a tool for releasing and locking a locking latch of a brake lining mounting, with which a brake lining is lockable at a lining holder.

BACKGROUND

Brake linings for disk brakes of rail vehicles are usually held, via a guide web provided on the back side of the brake lining, in a guide channel of a lining holder, which extends in the longitudinal direction of the lining holder.

This guide channel is provided, in cross section, with an undercut, in particular having a dovetail-shaped design, in which the guide web, adapted thereto, is situated. In the functional position, in order to lock the brake lining in the longitudinal direction of the lining holder, a locking latch is pivotably held at the lining holder, which protrudes into this guide channel in a locking position and is removed from the guide channel in a release position. This allows for a simple handling during a brake lining replacement.

SUMMARY

Disclosed embodiments provide a brake lining mounting for a rail vehicle in such a way that the brake lining replacement can be carried out in a simpler and more reliable way. Additionally, disclosed embodiments provide a tool for releasing and locking a locking latch of a brake lining mounting in such a way that the release and locking can be carried out in a simpler and more reliable way.

BRIEF DESCRIPTION OF THE FIGURES

Exemplary embodiments of the invention are explained in greater detail in the following by reference to the attached drawings.

Wherein.

DETAILED DESCRIPTION

A brake lining mounting of the generic type is known, for example, from DE 10 2009 006 290 A1.

A clip is utilized in this case for securing the locking latch in its locking position, which clip is coupled to the clip in the area of an end remote from a pivoting axle of the locking latch. The clip, which is designed as a spring clip, is preloaded at the lining holder on the one hand and at the locking latch on the other hand in such a way that it presses the locking latch into the locking position.

In order to be able to carry out a brake lining replacement, a camshaft, with an eccentric cam non-rotatably held thereon, must press a projection of the locking latch away and, in this way, pivot the locking latch into the release position.

Alternatively, the clip can also be tilted from the outside, with the aid of a tool, in such a way that the locking latch is pressed into the release position. A brake lining mounting of this type has proven effective, per se, in practical application.

The problem addressed by the presently disclosed embodiments is that of further developing a brake lining mounting for a rail vehicle in such a way that the brake lining replacement can be carried out in an even simpler and more reliable way.

A further problem addressed by the disclosed embodiments is that of further developing a tool for releasing and locking a locking latch of a brake lining mounting in such a way that the release and locking can be carried out in an even simpler and more reliable way.

The brake lining mounting according to the invention for a rail vehicle comprises a lining holder as well as a brake lining held at the lining holder in a locked manner. The lining holder comprises a guide channel extending in the longitudinal direction of the lining holder, in which the brake lining is displaceably held.

In order to lock the brake lining in the longitudinal direction of the lining holder, a locking latch is pivotably held at the lining holder, which protrudes into the guide channel in a locking position fixing the brake lining in a functional position and is removed from the guide channel in a release position.

A clip is arranged at an end of the locking latch remote from a pivoting axle of the locking latch, is pivotably mounted at the lining holder and, with the aid of which, the locking latch is pivotable between the locking position and the release position.

Moreover, the brake lining mounting comprises a tool for pivoting the locking latch, wherein the locking latch comprises a tool opening, into which the tool is insertable in order to pivot the locking latch.

The tool comprises a lever handle, an actuating journal insertable into the tool opening, a guide element guidable along a contour of the lining holder, and a pivoting axle insertable into the lining holder and arranged between the actuating journal and the guide element.

The guide element is positioned in relation to the actuating journal in such a way that the tool is detachable from the lining holder only in a locking position of the locking latch.

With the aid of a brake lining mounting designed in such a way and a tool designed in such a way, a brake lining replacement is made possible in a simple, ergonomic, and reliable way.

In particular, it is ensured that the tool can be removed from the lining holder only when the locking latch is locked.

In addition, the tool does not need to be fixedly held in the release position of the locking latch, and so the person carrying out the brake lining replacement has both hands free, in order to remove, if necessary, the brake lining to be replaced and to insert the brake lining to be installed into the guide channel.

In addition, the tool held at the lining holder acts as a visualization of a brake lining replacement that has not yet been completed, since the tool is detachable from the lining holder only in the locking position of the locking latch.

Advantageous embodiment variants of the invention are the subject matter of the dependent claims.

According to an advantageous embodiment variant, the guide element is designed as a guide journal with a neck piece and a head piece, wherein the neck piece is arranged in parallel to the pivoting axle at the lever handle of the tool.

According to a further advantageous embodiment variant, the actuating journal comprises a neck piece and a head piece, wherein the head piece of the actuating journal and the tool opening are shaped in such a way that the head piece is insertable into the tool opening only in the alignment of the tool opening, in which the locking latch is in the locking position.

In this way, the actuating journal fulfills two tasks simultaneously, namely, on the one hand, pivoting the locking latch upon actuation of the lever handle and, on the other hand, that the tool is insertable or removable only in this locking position and, in this way, the locking latch is effectively prevented from remaining in the release position, which can result in the brake lining falling out.

In order to prevent the clip from being pivoted out of the position holding the locking latch in the locking position, for example, due to getting hit by a stone, and, in the process, the locking latch pivoting into the release position, the clip according to a further embodiment variant is arranged on a side of the lining holder facing away from the brake lining in such a way that an end of a second limb of the clip, which is designed as a locking piece, protrudes out of the locking latch in the direction of the lining holder end and a free end of the first limb is accommodated in a bore hole of a bearing of the lining holder, while the remaining portions of the first limb, of the second limb, and a connection piece connected these to each other are arranged on a side of the locking latch facing the brake lever.

According to a further embodiment variant of the invention, the end of the locking latch remote from the pivoting axle is accommodated in a slot of a bearing of the lining holder in the locking position.

As a result, the locking latch is reliably secured against tilting in the locking position.

According to a further embodiment variant, the contour, along which the guide element is guidable, is integrally formed on the side of the bearing facing away from the pressure plate.

According to a further advantageous embodiment variant, the head piece of the guide element protrudes into the slot of the bearing of the lining holder after the locking latch has pivoted out of the locking position in the direction of the release position.

As a result, on the one hand, a tilting of the lever handle of the tool upon actuation of the tool is also effectively prevented. In addition, as a result, together with the locking of the head piece of the actuating journal in the tool opening of the locking latch, a jamming of the pivoting axle of the tool in the axle receptacle of the bearing is also prevented.

In the following description of the figures, terms such as above, below, left, right, front, back, etc., relate exclusively to the exemplary representation and position, selected in the particular figures, of the brake lining mounting, the lining holder, the brake lining, the tool, the lever handle, the locking latch, and the like. These terms are to be understood not to be restrictive, i.e., these references can change due to different operating positions or the mirror symmetrical configuration, or the like.

Figure 1:
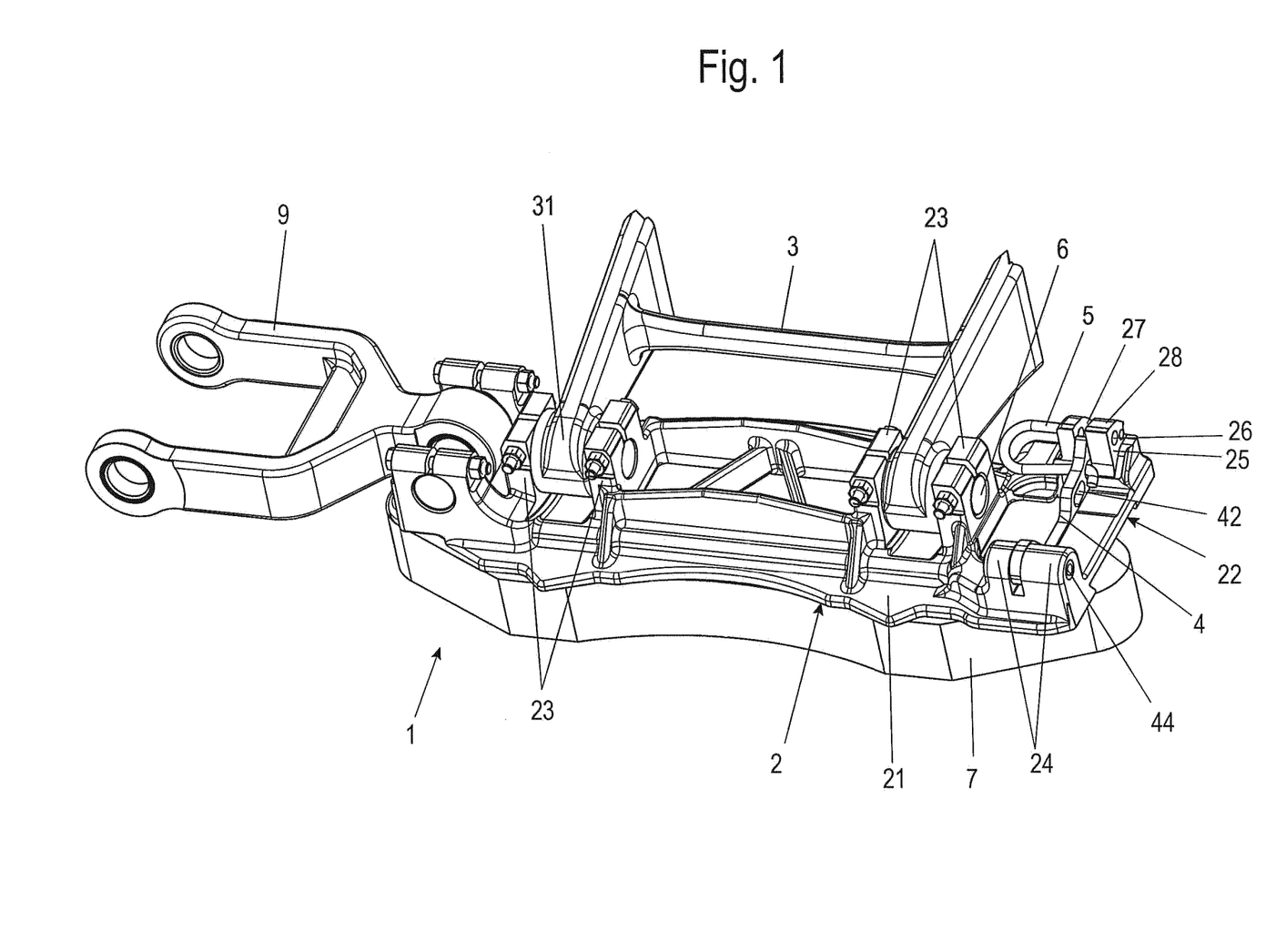
FIG. 1 shows a perspective view of an embodiment variant of a brake lining mounting according to the invention with a brake lining secured at a lining holder.

FIG. 1 shows an embodiment variant of a brake lining mounting according to the invention in the representation of a tool 8 applied at a lining holder 2 of the brake lining mounting.

The lining holder 2 essentially comprises a pressure plate 21, on the top side of which brake lever bearings 23 for supporting a brake lever 3 are integrally formed.

The brake lever bearings 23 are designed as slotted bearing blocks in this case, which centrally accommodate a bearing axle 6, which are guided through eyes 31 of the brake lever 3, which is therefore mounted at the lining holder 2 so as to be pivotable about an axis extending in the longitudinal direction of the lining holder 2.

A hanging shackle 9 is pivotably mounted in the area of an end observed in the direction of the longitudinal axis of the lining holder 2.

A locking latch 4 is pivotably held at the lining holder 2 on the end of the lining holder 2 positioned opposite the hanging shackle 9.

A brake lining 7 is displaceably held in a guide channel 22 of the lining holder 2. The guide channel 22 is integrally formed on the underside of the pressure plate 21 of the lining holder 2 facing away from the brake lever 3.

Accordingly, the brake lining 7 comprises a guide web (not represented), which has been slid in the guide channel 22 optionally formed in a dovetail-shaped manner in the cross section.

Figures 9, 10:
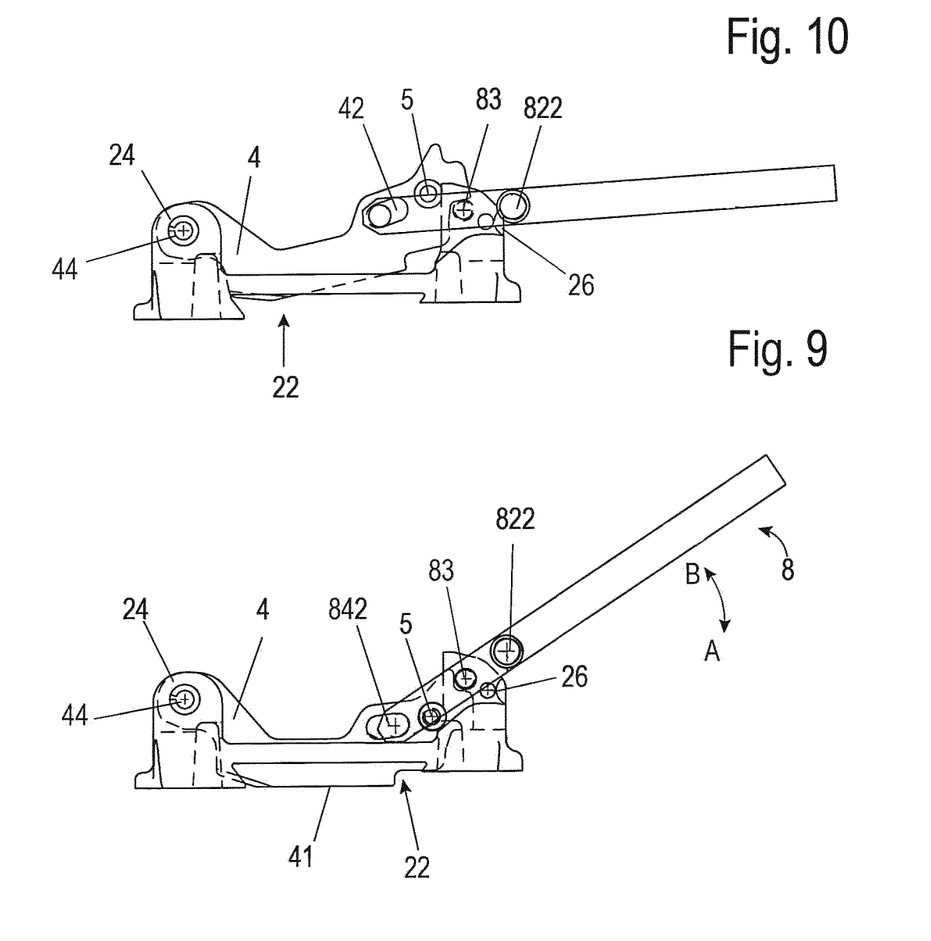
FIGS. 9 through 11 show side views of the lining holder with the applied tool in the locking position, an intermediate position between the locking position and the release position, and the release position.
Figure 11:
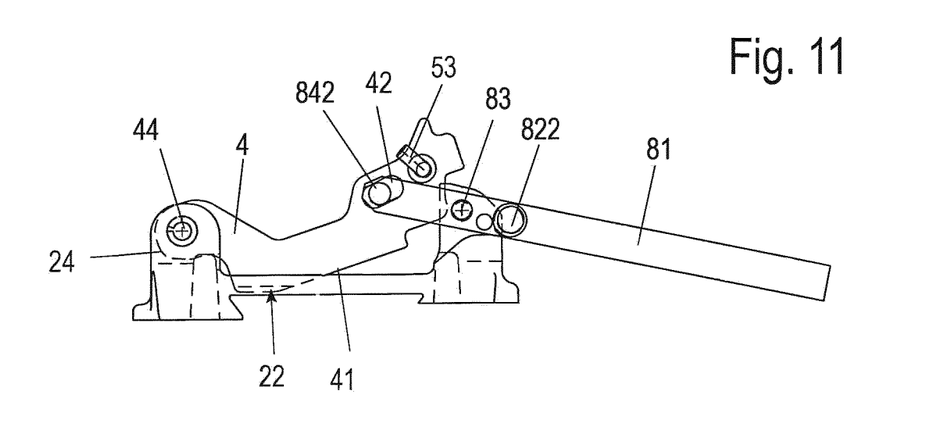

As is apparent in FIGS. 9 through 11, one of the edges of the locking latch 4 is designed as a locking bar 41, which protrudes into the guide channel 22 through a slot-like recess in the pressure plate 21 of the lining holder 2.

This position is also referred to in the following as the locking position of the locking latch 4.

A position in which the locking bar 41 is pivoted out of the slot-like recess in the pressure plate 21 of the lining holder 2 is referred to as the release position of the locking latch 4.

In this locking position, due to the fact that the brake lining 7 protrudes into the guide channel 22 with its guide web, the brake lining 7 is prevented from undergoing a displacement movement along the guide channel 22 and, as a result, is fixedly held in its functional position at the lining holder 2.

The locking latch 4 is held with one end at a pivot bearing 24 arranged, in particular integrally formed, on the lining holder 2, in order to carry out a pivoting movement. In the pivot bearing 24, a pivoting axle 44 of the locking latch 4 is guided therethrough, and so the locking latch 4 is held at the lining holder 2 so as to be pivotable about a pivoting axle 44 extending essentially in the direction of the longitudinal extension of the lining holder 2.

A clip 5, which is pivotably mounted at the lining holder 2, is arranged on an area of the locking latch 4 remote from the pivoting axle 44 of the locking latch 4.

Figure 2:
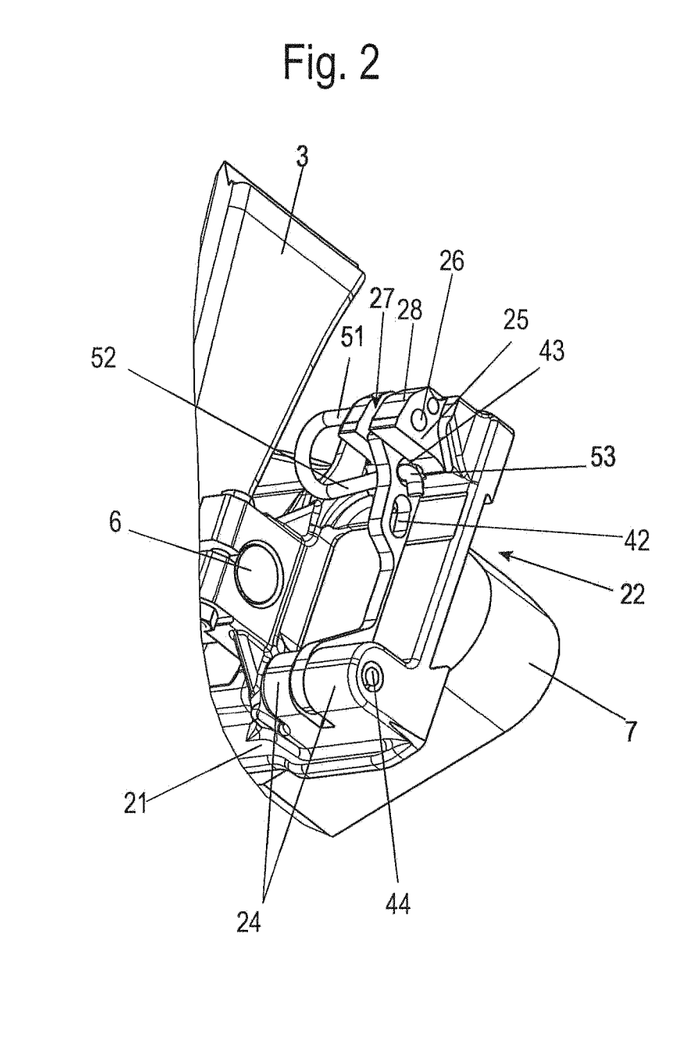
FIG. 2 shows an enlarged section of a portion of the lining holder of the brake lining mounting shown in FIG. 1 comprising the locking latch.
Figure 3:
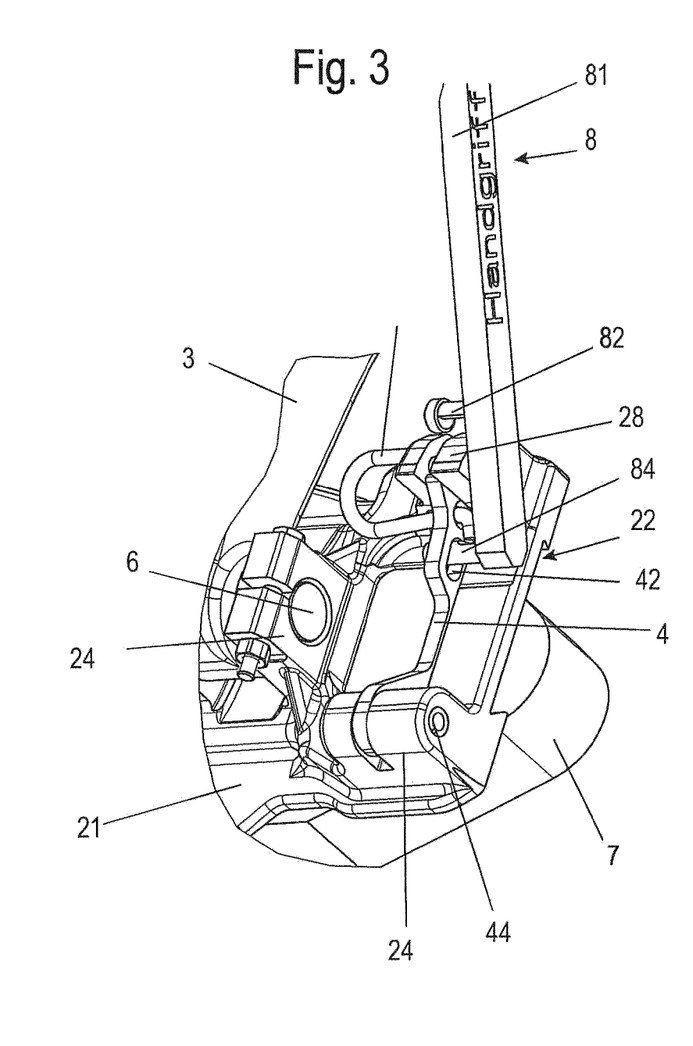
FIG. 3 shows a perspective view of the brake lining mounting section corresponding to FIG. 2 with a tool applied at the lining holder in the locking position of the locking latch.

The clip 5 is utilized for limiting the pivoting movement of the locking latch 4 to a pivot range between the locking position and the release position of the locking latch 4. For this purpose, the clip 5 is mounted, with a first limb 51, as is represented in FIGS. 2 and 3, in a bearing 25 of the lining holder 2 so as to be pivotable about an axis parallel to the pivoting axle 44 of the locking latch 4.

A second limb 52 of the clip 5 is guided, with its free end designed as a locking piece 53, through a clip receptacle 43 of the locking latch 4 designed as a bore hole.

The clip 5 is approximately U-shaped overall and is optionally made of a spring steel, which, under preload, in the locking position, presses the locking latch 4 into the locking position.

In order to prevent an unintentional pivoting of the clip 5, for example, due to getting hit by a stone, the clip 5 is arranged on a side of the pressure plate 21 of the lining holder 2 facing away from the brake lining 7 in such a way that the locking piece 53 protrudes out of the locking latch 4 in the direction of the lower end of the lining holder (at which the locking latch 4 is arranged), while the remaining portions of the first limb 51, of the second limb 52, and an optionally curved connection piece connecting these to each other are arranged on a side of the locking latch 4 facing the brake lever. Due to this arrangement, the clip 5 is shielded against stones whirled up from a gravel bed of a rail by the upper portion of the locking latch 4, which protrudes out of the side of the pressure plate 21 of the lining holder 2 facing away from the brake lining 7.

Figure 7:
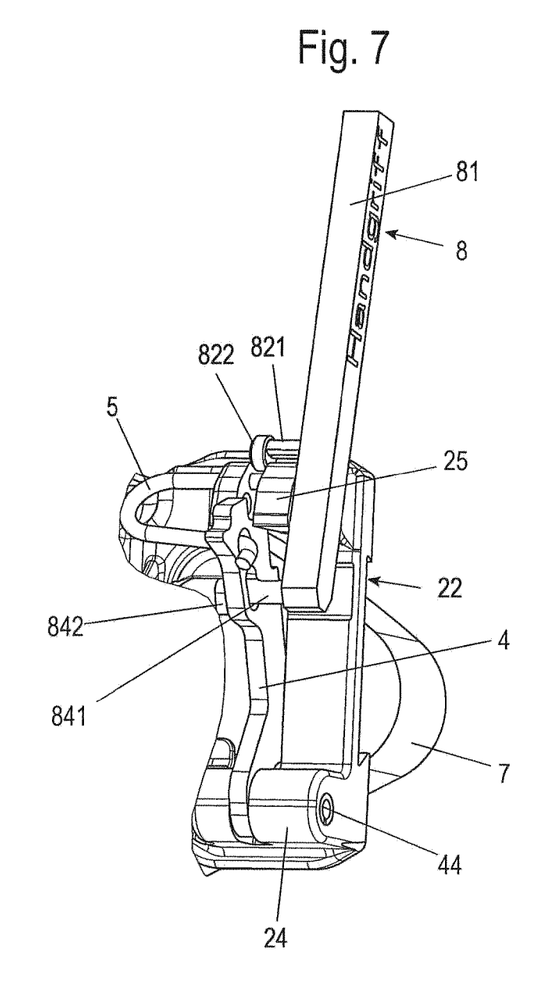
FIGS. 7 and 8 show representations corresponding to FIGS. 5 and 6 in the release position of the locking latch.
Figure 8:
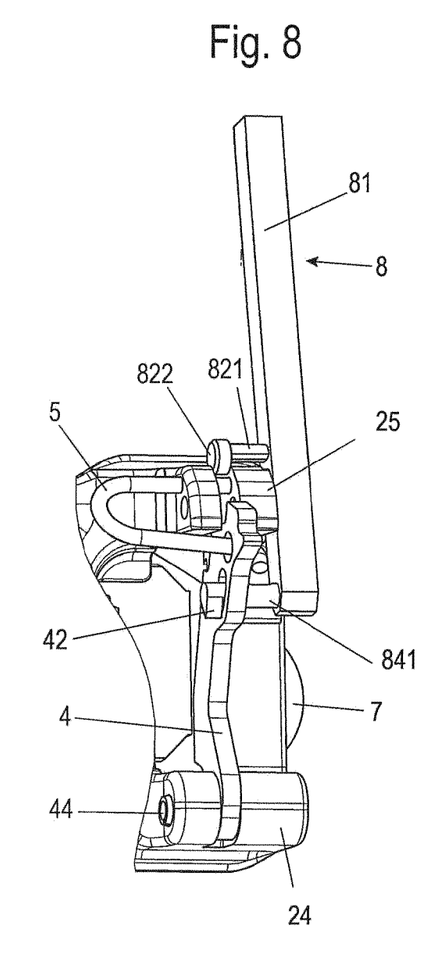

In the release position of the locking latch 4, as is shown, for example, in FIGS. 7 and 8, the clip 5 is relaxed and, in this way, holds the locking latch 4 in the release position.

In order to carry out a replacement of the brake lining 7, it is necessary to pivot the locking latch 4 out of its locking position into the release position. A tool 8 is utilized for this purpose, which is used for pivoting the locking latch 4.

The locking latch 4 comprises a tool opening 42, into which the tool 8 is insertable in order to pivot the locking latch 4.

Figure 4:
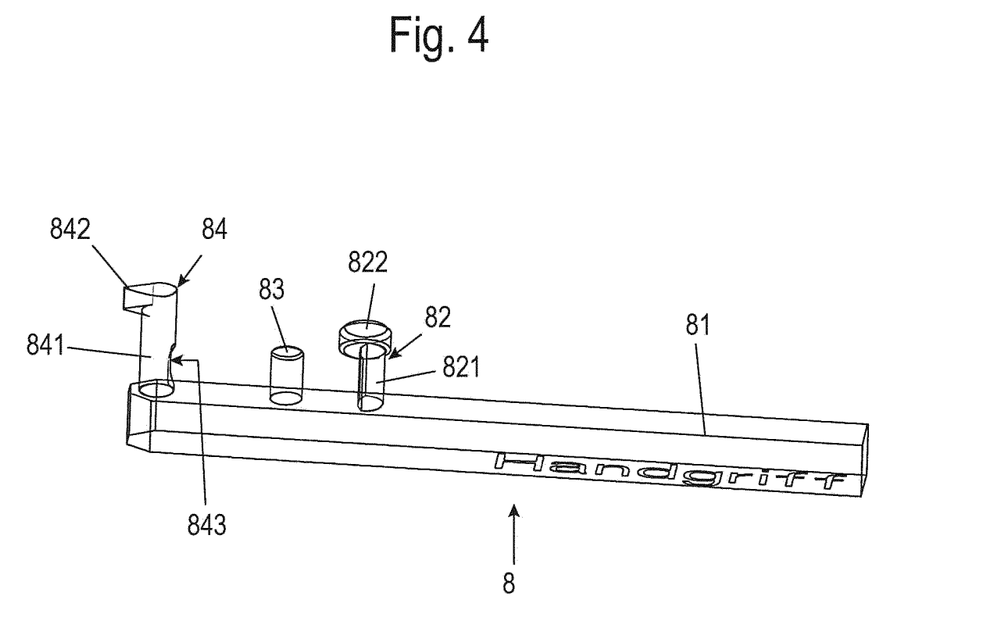
FIG. 4 shows a diagrammatic perspective view of an embodiment variant of a tool of the brake lining mounting.
Figure 5:
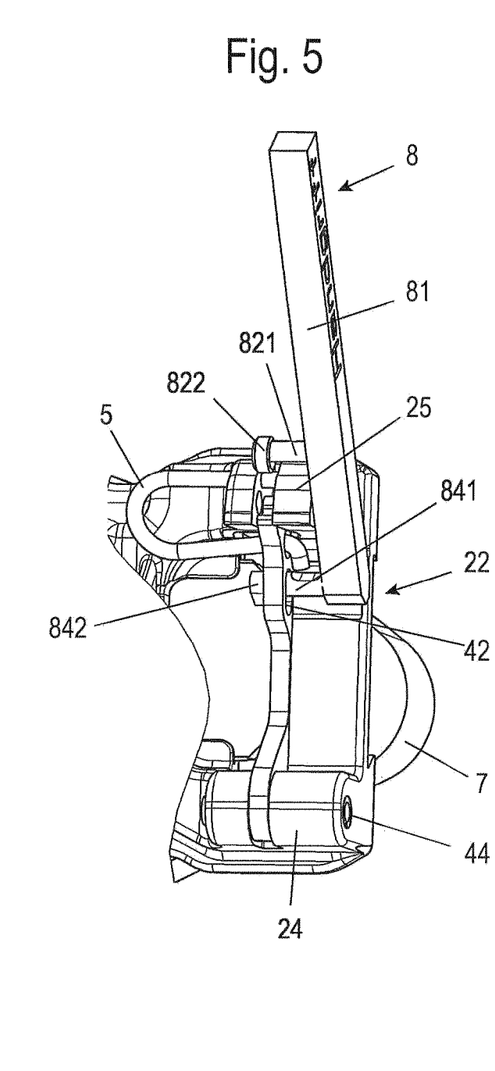
FIGS. 5 and 6 show a perspective detailed view of the section of the brake lining mounting represented in FIG. 2 with the applied tool in the locking position of the locking latch.
Figure 6:
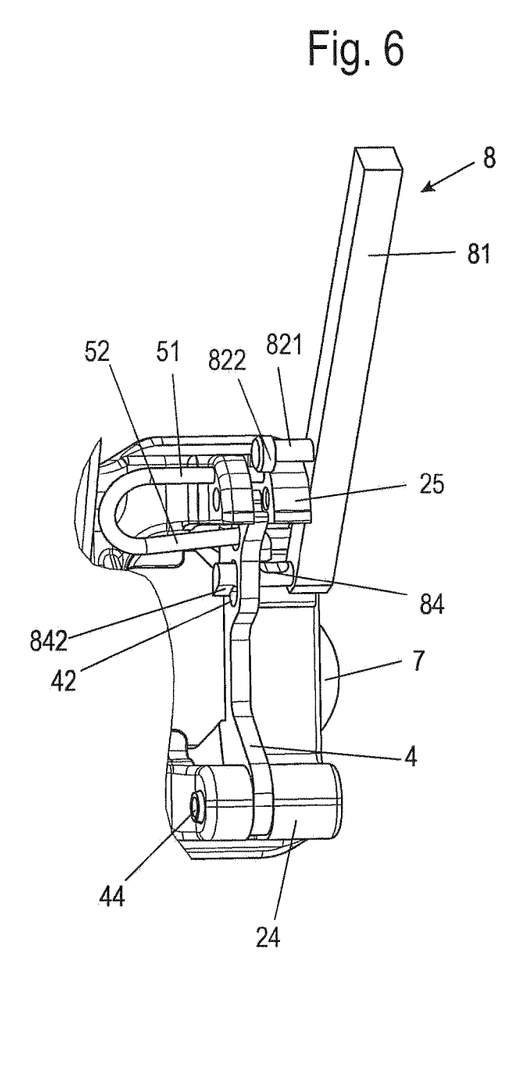

The tool 8 shown in the individual representation in FIG. 4 comprises a lever handle 81, an actuating journal 84 insertable into the tool opening 42, a guide element 82 guidable along a contour 28 of the lining holder 2, and a pivoting axle 83 insertable into the lining holder 2 and arranged between the actuating journal 84 and the guide element 82.

If the locking latch 4 is located in its locking position, the tool 8 can be applied at the locking latch 4 and the bearing 25 of the lining holder 2.

In the process, on the one hand, the pivoting axle 83 is inserted into an axle receptacle 26 of the bearing 25 provided therefor. Simultaneously, the actuating journal 84 is inserted into the tool opening 42.

The insertion of the actuating journal 84 into the tool opening 42 is possible only in the locking position of the locking latch 4. For this purpose, as shown in FIGS. 3 through 6, a head piece 842 of the actuating journal 84 is designed with a configuration that allows for an insertion of the head piece 842 into the tool opening 42 of the locking latch 4 only in a predetermined angular position.

The tool opening 42 is designed as an oblong hole in this case, while the head piece 842 of the actuating journal 84 is shaped, in this case, in such a way that it is insertable through the tool opening 42 in the predetermined angular position, but engages behind the wall bordering the tool opening 42 upon a pivoting of the tool 8 and, therefore, a pivoting of the head piece 842 of the actuating journal 84 after having been guided through the tool opening 42. As a result, the head piece 842 is prevented from being pulled out through the tool opening 42 in the release position of the locking latch 4 represented in FIGS. 7 and 8.

The guide element 82 also comprises a neck piece 821 and a head piece 822.

The neck piece 821 acts as a guide journal, which extends in parallel to the pivoting axle 83 at the lever handle 81 of the tool 8. This neck piece 821 is guidable along the contour 28 of the lining holder 2. In the exemplary embodiment variant shown here, the contour 28 is integrally formed on the side of the bearing 25 facing away from the brake lining 7.

The contour 28 of the bearing 25 is shaped in such a way that, in the locking position of the locking latch 4, the head piece 822 of the guide element 82 is extends over the contour 28 to a considerable extent, in order to make it possible to insert the pivoting axle 83 of the tool 8 into the axle receptacle 26 in the bearing 25.

After the tool 8 has been pivoted in an unlocking direction A, in which the locking latch 4 is moved in the direction of the release position, the head piece 822 of the guide element 82 successively comes in a position behind the contour 28 of the bearing 25 and, therefore, prevents a movement of the head piece 822 in parallel to the pivoting axle 83 of the tool 8 and, therefore, a removal of the tool from the lining holder 2.

Moreover, as represented in FIGS. 1 through 3 and 5 through 8, the end of the locking latch 4 remote from the pivoting axle 44, in the locking position, is accommodated in a slot 27 of the bearing 25 of the lining holder 2, whereby the locking latch 4 is secured against tilting due to a displacement of the brake lining 7 along the longitudinal axis of the lining holder 2.

When the tool 8 is applied, the head piece 822 of the guide element 82 protrudes into the slot 27 of the bearing 25 of the lining holder 2 after the locking latch 4 has pivoted in the direction of the release position and, therefore, ensures that a pivoting movement of the lever handle 81 of the tool 8 is carried out correctly.

The pivoting movement of the tool 8 in order to release the brake lining 7 from its position at the lining holder 2 locked by the locking latch 4 is represented in FIGS. 9, 10, and 11.

FIG. 9 shows the locking position, in which the locking bar 41 of the locking latch 4 protrudes into the guide channel 22 of the lining holder 2.

The tool 8 is applied at the lining holder 2 in this case. The pivoting axle 83 is accommodated in the axle receptacle 29 of the lining holder 2. The actuating journal 84 is inserted into the tool opening 42. In this position, the guide element 82 is located above the contour 28 of the bearing 25 of the lining holder 2.

FIG. 10 shows an intermediate position of the tool 8 and of the locking latch 4 between the locking position and the release position.

In this case, the locking bar 41 has been partially pivoted out of the guide channel 22. The head piece 842 of the actuating journal 84 already partially engages behind the back-side wall of the locking latch 4 bordering the tool opening 42, and so the tool 8, in this position, can no longer be removed from the lining holder 2. The guide element 82 is placed onto the contour 28 of the bearing 25.

Finally, FIG. 11 shows the release position of the locking latch 4, in which the locking bar 41 completely releases the guide channel 22, and so a brake lining 7 guided in the guide channel 22 can be pushed out or can slip out of the lining holder 2.

Since the tool cannot be removed in the release position of the locking latch 4, it is thereby made possible that the person carrying out the lining replacement can let go of the tool 8 and, therefore, has both hands free, in order to be able, in particular, to insert the new brake lining into the lining holder 2.

In order to be able to remove the tool 8 again after the insertion of a new brake lining 7 into the lining holder 2, the tool is pivoted in a locking direction B opposite to the unlocking direction A.

In order to secure the brake lining 7 against slipping out of the guide channel 22, the locking latch 4 is pivoted, with its locking bar 41, back into the slot-like recess in the pressure plate 21 of the lining holder 2.

The head piece 822 of the guide element 82 successively reaches a position above the contour 28 of the bearing 25. Likewise, during this pivoting movement, the head piece 842 of the actuating journal 84 returns to a position, in which it is movable out of the tool opening 42 in the direction parallel to the pivoting axle 83 of the tool 8, and so, after the locking position of the locking latch 4 has been reached, the tool 8 can be removed from the lining holder 2 in the direction parallel to the pivoting axle 83 of the tool 8.

LIST OF REFERENCE CHARACTERS 2 lining holder
21 pressure plate
22 guide channel
23 brake lever bearing
24 pivot bearing
25 bearing
26 axle receptacle
27 slot
28 contour
3 brake lever
4 locking latch
41 locking bar
42 tool opening
43 clip receptacle
44 pivoting axle
5 clip
51 first limb
52 second limb
53 locking piece
6 bearing axle
7 brake lining
8 tool
81 lever handle
82 guide element
821 neck piece
822 head piece
83 pivoting axle
84 actuating journal
841 neck piece
842 head piece
9 hanging shackle
A unlocking direction
B locking direction

The invention claimed is:

1. A brake lining mounting for a rail vehicle, the mounting comprising:
a lining holder;
a brake lining held, in a locked manner, at the lining holder,
wherein the lining holder includes a pressure plate with a guide channel extending in the longitudinal direction of the lining holder, in which the brake lining is displaceably held,
wherein, in order to lock the brake lining in the longitudinal direction of the lining holder, a locking latch is pivotably held at the lining holder, which protrudes into the guide channel in a locking position fixing the brake lining in a functional position and is removed from the guide channel in a release position,
wherein a clip is arranged at an end of the locking latch remote from a pivoting axle of the locking latch, is pivotably mounted at the lining holder and, with the aid of which, the locking latch is pivotable between the locking position and the release position,
a tool for pivoting the locking latch, wherein the locking latch comprises a tool opening, into which the tool is insertable in order to pivot the locking latch the tool comprises a lever handle, an actuating journal insertable into the tool opening, a guide element guidable along a contour of the lining holder, and a pivoting axle insertable into the lining holder and arranged between the actuating journal and the guide element,
wherein the guide element is positioned in relation to the actuating journal such that the tool is detachable from the lining holder only in the locking position of the locking latch.

2. The brake lining mounting of claim 1, wherein the guide element is a guide journal with a neck piece and a head piece, wherein the neck piece is arranged in parallel to the pivoting axle at the lever handle of the tool.

3. The brake lining mounting of claim 1, wherein the actuating journal comprises a neck piece and a head piece, wherein the head piece of the actuating journal and the tool opening are shaped such that the head piece is insertable into the tool opening only in the alignment of the tool opening, in which the locking latch is in the locking position.

4. The brake lining mounting of claim 1, wherein the clip is arranged on a side of the pressure plate facing away from the guide channel such that an end of a second limb of the clip designed as a locking piece protrudes out of the locking latch in the direction of the end of the lining holder and a free end of the first limb is accommodated in a bore hole of a bearing of the lining holder, while the remaining portions of the first limb, of the second limb, and a connection piece connecting these to each other are arranged on a side of the locking latch facing a brake lever.

5. The brake lining mounting of claim 1, wherein the end of the locking latch remote from the pivoting axle is accommodated in a slot of a bearing of the lining holder in the locking position.

6. The brake lining mounting of claim 1, wherein the contour, along which the guide element is guidable, is integrally formed on the side of a bearing facing away from the pressure plate.

7. The brake lining mounting of claim 1, wherein a head piece of the guide element protrudes into a slot of a bearing of the lining holder after the locking latch has pivoted out of the locking position in the direction of the release position.

8. A tool for actuating a locking latch of a brake lining mounting locking a brake lining at a lining holder for a rail vehicle, comprising
a lever handle, an actuating journal arranged at the lever handle, which is insertable into a tool opening of the locking latch, wherein—a guide element and a pivoting axle arranged between the actuating journal and the guide element are arranged at the lever handle, wherein the guide element is guidable along a contour of the lining holder, and wherein the guide element is positioned in relation to the actuating journal such that the tool is detachable from the lining holder only in a locking position of the locking latch.

9. The tool as claimed in claim 8, wherein the guide element is a guide journal with a neck piece and a head piece, wherein the neck piece is arranged in parallel to the pivoting axle at the lever handle of the tool.

10. The tool as claimed in claim 8, wherein the actuating journal comprises a neck piece and a head piece, wherein the head piece of the actuating journal and the tool opening are shaped such that the head piece is insertable into the tool opening only in the alignment of the tool opening, in which the locking latch is in the locking position.

\* \* \* \* \*